Nov. 7, 1939.    F. E. JOHNSON    2,179,410
TRAILER
Filed Dec. 10, 1938    2 Sheets-Sheet 1
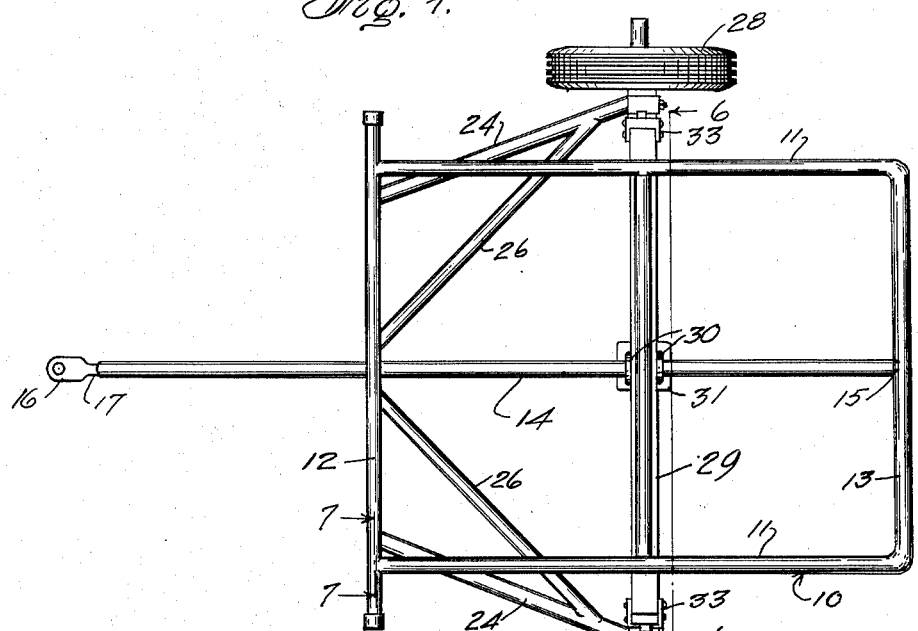
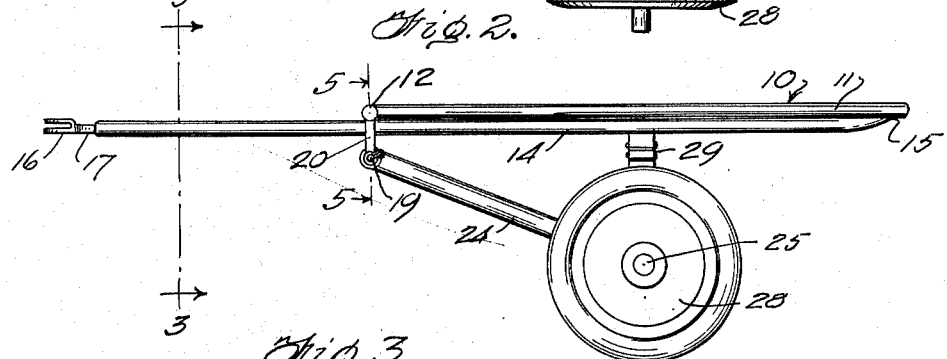
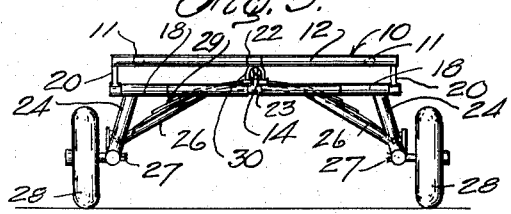
Inventor
Foy E. Johnson, Nov. 7, 1939.   F. E. JOHNSON   2,179,410
TRAILER
Filed Dec. 10, 1938   2 Sheets-Sheet 2
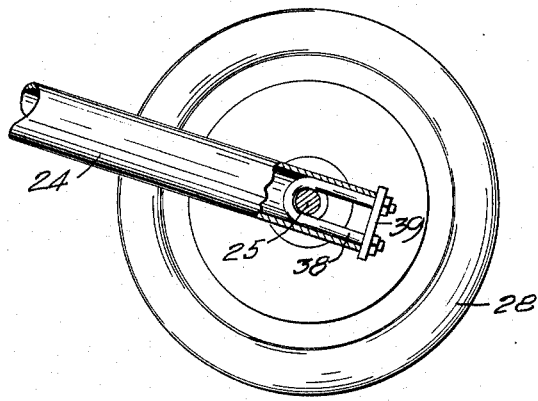
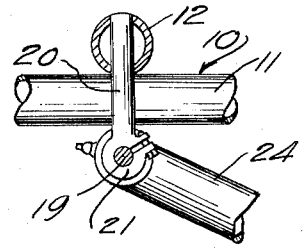
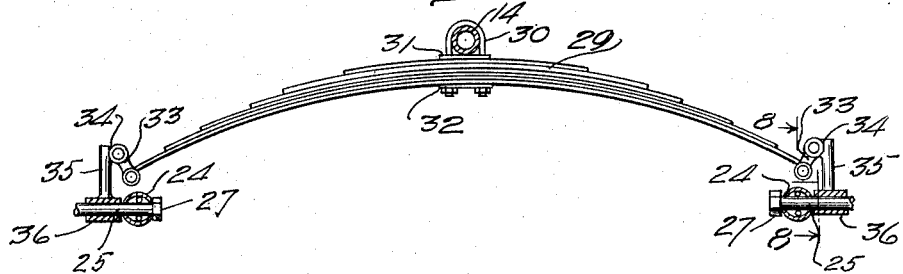
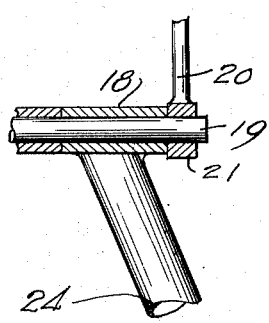
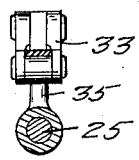
Inventor
FOY E. JOHNSON,
By Kimmel & Crowell
Attorneys Patented Nov. 7, 1939

2,179,410

UNITED STATES PATENT OFFICE 2,179,410

TRAILER

Foy Eugene Johnson, Turkey, Tex.

Application December 10, 1938, Serial No. 245,027

9 Claims. (Cl. 280—33.4)

This invention relates to trailers and more particularly to a trailer chassis.

An object of this invention is to provide an improved trailer chassis which may be constructed out of tubular material so that the frame will be relatively light in weight but at the same time sufficiently strong to support the desired body.

Another object of this invention is to provide a relatively light built trailer chassis which may be connected to a tractor, the chassis being so constructed as to use a bowed or transverse spring to yieldingly support the body or frame.

A further object of this invention is to provide a relatively light trailer chassis which may have the construction thereof varied to suit the particular body which is adapted to be secured thereto, the chassis being of a relatively light construction so as to eliminate the excessive pull on the tractor and at the same time permitting the use of a heavier body without unduly adding to the pull on the tractor vehicle.

To the above objects and others which may hereinafter appear, the invention consists of the novel construction, combination and arrangement of parts as will be more specifically referred to and illustrated in the accompanying drawings wherein is shown an embodiment of the invention, but it is to be understood that changes, modifications and variations may be resorted to which fall within the scope of the invention as claimed.

In the drawings:

Figure 1 is a detail top plan of a trailer chassis or frame constructed according to an embodiment of this invention, Figure 2 is a detail side elevation of the trailer, Figure 3 is a sectional view taken on the line 3—3 of Figure 2, Figure 4 is a fragmentary side elevation partly broken away of the wheel supporting arm, Figure 5 is a sectional view taken on the line 5—5 of Figure 2, Figure 6 is a sectional view taken on the line 6—6 of Figure 1, and Figure 7 is a sectional view taken on the line 7—7 of Figure 1.

Figure 8 is a sectional view taken on the line 8—8 of Figure 6.

Referring to the drawings the numeral 10 designates generally a frame structure comprising side frame members 11, a rear end member 13 and a front end member 12. The frame embers 11, 12 and 13 are constructed of tubular material and if desired, the side frame members 11 may be constructed integral with the rear frame member 13 by bending a pipe section so as to provide a substantially U-shaped frame member and the free or forward ends of the side members 11 are then welded to the front cross frame member 12. The front member 12 is shown in Figure 1 projects outwardly beyond the side frame members 11, the purpose for which will be hereinafter described.

A tubular draw bar 14 extends longitudinally of the frame 10 and has the rear end thereof secured as at 15 to the longitudinal center of the rear end member 13. The draw bar 14 extends beneath the front frame member 12 and may be secured as by welding or the like to the under side of the frame member 12. The draw bar 14 at its forward end is provided with a U-shaped coupling member 16 having a stem 17 secured thereto which extends into the forward end of the draw bar 14 and may be welded or otherwise fixedly secured in the draw bar 14.

A pair of tubular sleeve or bushing members 18 are disposed beneath the frame member 10 at the forward end thereof and are rockably mounted on a rod or bar 19 disposed in transverse relation with respect to the said frame 10. The rod 19 is arranged below, aligns with and is of greater length than the frame member 12. The rod 19 is supported below the frame 10 by means of a pair of downwardly extending arms 20 which are secured at their upper ends to the outer ends of the front frame member 12. The arms 20 are provided at their lower ends with adjustable clamps 21 mounted on the ends of the rod 19 for the purpose of fixedly clamping said rod to the arms 20. The bar 19, arms 20 and clamps 21 constitute a suspension. An inverted T-shaped support or hanger for the suspension aforesaid is disposed centrally of and depends from the frame member 12. The said support comprises a vertical arm 22 terminating at its lower end into and centrally of a horizontal sleeve or bushing 23 mounted on the rod 19 and arranged between the inner ends of the sleeves 18. These latter have their outer ends bear against the inner sides of the clamps 21. The arm 22 extends through the draw bar 14 and is mounted in the central portion of the tubular frame member 12 at substantially the longitudinal center of this frame member.

A downwardly and rearwardly extending wheel supporting arm 24 is secured at its forward or upper end to the sleeve 18 and at its lower or rear end is secured to a spindle 25 disposed at right angles thereto. A rearwardly and outwardly extending downwardly inclined bracing member 26 is secured at its forward or upper end to the sleeve 23 adjacent the outer end of the latter and has its lower or rear end secured, by welding or the like, to the inner side and at a point forwardly of the lower end of the said arm 24. There are two arms 24 and each arm is provided with a racing member 26 and a spindle 25. One arm 24 is secured to one sleeve 18 and the other arm 24 to the other sleeve 18. The arms 24 are oppositely disposed. The spindles 26 are oppositely and horizontally disposed. The members 26 are oppositely disposed and are secured to the sleeve 23 in spaced relation intermediate the ends of such sleeve. The spindles 25 are relatively short in length, are extended outwardly with respect to the lower ends of arms 24 and are secured to the arms 24 by lock nuts 27. Wheels 28 are mounted on the outer ends of the spindles 25 and may be provided with pneumatic tires.

A substantially semi-elliptical spring structure 29 extends transversely beneath the frame 10 and is secured as by a pair of U-bolts 30 to the draw bar 14 at a point substantially mid-way of the length of the frame 10. The U-bolts 30 engage through upper and lower plates 31 and 32 engaging on the upper and lower sides of the spring 29. The spring 29 has the opposite ends thereof secured to spring shackles or suspending members 33 which engage an outstanding lug 34 carried by an upstanding post or spring supporting member 35. The post 35 has a sleeve 36 on its lower end through which the spindle 25 engages.

In the use and operation of this trailer the frame or chassis structure 10 is adapted to have secured to the upper side thereof a suitable body and where a relatively long body is provided a second frame structure similar to that hereinbefore described may be secured beneath the body at a suitable point for supporting the body. The coupling 16 is adapted to be secured to the rear of the tractor vehicle and the weight of the body will be taken up by the flexing of the spring 29. The flexing of the spring 29 will cause the wheel arms 24 to rock on the sleeves or bushing members 18. If desired, the sleeves 18 may have positioned therein tubular bushings or bearings adjacent each end thereof so as to provide the desired bearing structure between the sleeves 18 and the supporting rod 19. An intermediate frame member 37 may be secured between the two side members 11 at a point mid-way between the lengths of the side members 11 and above the spring 29. The draw bar 14 may be secured to the underside of the intermediate frame member 37 and the U-bolts 30 may be positioned one on each side of the frame member 37. Due to the light construction of the frame work 10, the trailer chassis will not be heavy to pull and in this manner it will not require a great amount of power taken from the tractor vehicle to pull the trailer. Furthermore, by welding the various joints between the frame of the members the entire chassis will be rigid and at the same time constructed of relatively light tubular material which will not readily bend under various stresses to which the chassis is subjected.

The spindle 25 is fixedly secured in the lower or rear ends of the wheel arms 24 by means of a U-shaped bolt 38 which has the free ends thereof extended through a plate 39 and engaging the rear ends of the arms 24. The arms 24 are provided with an opening therethrough through which the spindles are projected and the bolts 39 firmly hold the spindles 25 in the ends of the arms 24.

What I claim is:

1. A trailer comprising a horizontally disposed rectangular frame structure formed of a U-shaped tubular frame member and a tubular front member, a tubular connecting member connecting the free ends of said U-shaped member together, and having end terminal portions extending laterally in opposite directions from said ends, a pair of wheel supporting arms, a depending suspension connected to the laterally extended portions of said front frame member, means swingably securing said arms to said suspension, a spindle carried by each arm, a draw bar extending longitudinally of the frame structure and fixed to said front and rear frame members, a semi-elliptical spring disposed transversely of said frame structure, means securing said spring to said draw bar, and means mounted on and for rockably securing the ends of said spring to said spindles.

2. A trailer comprising a horizontally disposed rectangular frame structure formed of a U-shaped tubular frame member and a tubular front member, a tubular connecting member connecting the free ends of said U-shaped member together and having end terminal portions extending laterally in opposite directions from said ends, a pair of tubular wheel supporting arms, a transversely extending bar beneath said frame structure at one end thereof, means connected to the ends of the front frame member and to the ends of said bar for supporting said bar below said frame structure, a sleeve carried by each of said arms at one end thereof rockably engaging said bar, a spindle carried by each arm at the other end thereof, means securing a spindle on an arm, a draw bar extending longitudinally of and secured to the front and rear of the frame structure, a semi-elliptical spring disposed transversely of said frame structure, means securing said spring to said draw bar, and means rockably securing the ends of said spring on said spindles.

3. A trailer comprising a rectangular frame structure formed of side and end members, a draw bar extending longitudinally of said frame, a transversely extending rod beneath said frame at one end of the latter, means fixed to one end of said bar and frame supporting said rod in spaced relation to said frame, a pair of sleeves loose on said bar, a wheel supporting arm fixed at one end to each sleeve, a spindle carried by the opposite end of each arm, a depending hanger fixed to one of the ends of said frame and to said draw bar and surrounding said rod, a semi-elliptical spring extending transversely beneath said frame, means securing said spring to said draw bar, and means rockably securing the ends of said spring on said spindles.

4. A trailer comprising a tubular frame rectangular in plan, a draw bar extending longitudinally of said frame, an intermediate frame member secured at its ends to the sides of said frame, a transversely extending rod at one end of said frame, means supporting said rod in dependent relation to said frame, a pair of wheel supporting arms disposed one on each side of said frame, a bearing sleeve secured to one end of an arm and rockably engaging said rod, a bracing member connected to a sleeve and an arm, a spindle at the opposite end of each arm, a U-shaped securing member securing a spindle in an arm, and a semi-elliptical spring secured to said spindles and said frame.

5. A trailer comprising a tubular frame rectangular in plan, a draw bar extending longitudinally of said frame, an intermediate frame member secured at its ends to the sides of said frame, a transversely extending rod at one end of said frame, means supporting said rod in dependent relation to said frame, a pair of wheel supporting arms disposed one on each side of said frame, a bearing sleeve secured to one end of an arm and rockably engaging said rod, a bracing member connected to a sleeve and an arm, a spindle at the opposite end of each arm, a U-shaped securing member securing a spindle in an arm, a sleeve on each spindle, an upstanding post secured to said latter sleeves, a bowed spring extending transversely of said frame, means swingably securing the ends of said spring to said posts, and means securing said spring to said draw bar.

6. A trailer comprising a frame including front, side and rear frame members, said front member having end terminal portions extended laterally with respect to said side members, a suspension arranged below and connected to the ends of said front member, spaced sleeves on said suspension, oppositely disposed rearwardly and outwardly directed downwardly inclined spindles supporting arms connected at their forward ends to said sleeves, oppositely disposed outwardly directed wheel supporting spindles connected to the rear ends of said arms, a semi-elliptical spring arranged below and disposed at the transverse median of said frame, a draw bar fixed to said front and rear members, arranged below the frame and above said spring, means for securing said spring at its transverse center to said draw bar and means loosely mounted on said spindles for rockably connecting the ends of the spring with the spindles.

7. A trailer comprising a frame including front, side and rear frame members, said front member having end terminal portions extended laterally with respect to said side members, a suspension arranged below and connected to the ends of said front member, spaced sleeves on said suspension, oppositely disposed rearwardly and outwardly directed downwardly inclined spindle supporting arms connected at their forward ends to said sleeves, oppositely disposed outwardly directed wheel supporting spindles connected to the rear ends of said arms, a semi-elliptical spring arranged below and disposed at the transverse median of said frame, a draw bar fixed to said front and rear members, arranged below the frame and above said spring, means for securing said spring at its transverse center to said draw bar, means loosely mounted on said spindles for rockably connecting the ends of the spring with the spindles, and a hanger secured to said front member extending through said draw bar and encompassing said suspension between said sleeves.

8. A trailer comprising a frame including front, side and rear frame members, said front member having end terminal portions extended laterally with respect to said side member, a suspension arranged below and connected to the ends of said front member, spaced sleeves on said suspension, oppositely disposed rearwardly and outwardly directed downwardly inclined spindle supporting arms connected at their forward ends to said sleeves and being of tubular form, oppositely disposed outwardly directed wheel supporting spindles extending through said arms in proximity to the rear ends of the latter, means arranged in the rear portions of and abutting the rear ends of said arms for securing said spindles in fixed relation with respect to said arms, a semi-elliptical spring arranged below and disposed at the transverse median of said frame, a draw bar fixed to said front and rear members, arranged below the frame, above the suspension and above said spring, means for securing said spring at its transverse center to said draw bar, and means loosely mounted on said spindles for rockably connecting the ends of said spring with the spindles.

9. A trailer comprising a frame including front, side and rear frame members, said front member having end terminal portions extended laterally with respect to said side member, a suspension arranged below and connected to the ends of said front member, spaced sleeves on said suspension, oppositely disposed rearwardly and outwardly directed downwardly inclined spindle supporting arms connected at their forward ends to said sleeves and being of tubular form, oppositely disposed outwardly directed wheel supporting spindles extending through said arms in proximity to the rear ends of the latter, means arranged in the rear portions of and abutting the rear ends of said arms for securing said spindles in fixed relation with respect to said arms, a semi-elliptical spring arranged below and disposed at the transverse median of said frame, a draw bar fixed to said front and rear members, arranged below the frame, above the suspension and above said spring, means for securing said spring at its transverse center to said draw bar, means loosely mounted on said spindles for rockably connecting the ends of said spring with the spindles, a hanger secured to said front member extending through the draw bar and encompassing said suspension between said sleeves, and bracing means for said arms, said means being secured with said suspension and to said arms in proximity to the rear ends of the latter.

FOY EUGENE JOHNSON.